US008032571B2

(12) United States Patent
Lee (10) Patent No.: US 8,032,571 B2
(45) Date of Patent: Oct. 4, 2011

(54) METHOD AND APPARATUS FOR AUTOMATICALLY CLASSIFYING FILES ON MOBILE COMMUNICATION TERMINAL

(75) Inventor: Min-Kyung Lee, Gum-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 306 days.

(21) Appl. No.: 11/822,345

(22) Filed: Jul. 5, 2007

(65) Prior Publication Data

US 2008/0034006 A1  Feb. 7, 2008

(30) Foreign Application Priority Data

Aug. 2, 2006  (KR) .................. 10-2006-0072882

(51) Int. Cl.
*G06F 17/30* (2006.01)
(52) U.S. Cl. .................. 707/824; 707/828; 707/913
(58) Field of Classification Search ............ 707/824, 707/828, 913–916, 999.2, 999.107, 999.01, 707/999.006, 999.007
See application file for complete search history.

(56) References Cited

U.S. PATENT DOCUMENTS

| 5,765,170 | A | 6/1998 | Morikawa | |
|---|---|---|---|---|
| 6,466,238 | B1 * | 10/2002 | Berry et al. ............... | 715/847 |
| 6,930,709 | B1 * | 8/2005 | Creamer et al. ........... | 348/211.3 |
| 7,007,022 | B2 * | 2/2006 | Ban .......................... | 1/1 |
| 2002/0003548 | A1 * | 1/2002 | Krusche et al. ............ | 345/736 |
| 2003/0096605 | A1 * | 5/2003 | Schlieben et al. .......... | 455/419 |
| 2004/0059776 | A1 * | 3/2004 | Pitzel et al. ............... | 709/203 |
| 2005/0044084 | A1 * | 2/2005 | Huang ....................... | 707/100 |
| 2005/0075115 | A1 * | 4/2005 | Corneille et al. .......... | 455/456.3 |
| 2006/0039561 | A1 * | 2/2006 | Ypya et al. ................. | 380/270 |
| 2006/0123010 | A1 * | 6/2006 | Landry et al. .............. | 707/10 |
| 2006/0135190 | A1 * | 6/2006 | Drouet et al. .............. | 455/514 |
| 2006/0155706 | A1 | 7/2006 | Kalinichenko et al. | |
| 2007/0109608 | A1 * | 5/2007 | Lunt et al. .................. | 358/403 |
| 2008/0189752 | A1 * | 8/2008 | Moradi et al. ............. | 725/105 |
| 2009/0172040 | A1 * | 7/2009 | Mosek ........................ | 707/200 |

FOREIGN PATENT DOCUMENTS

| EP | 1 400 976 A2 | 3/2004 |
|---|---|---|
| JP | 07-013828 | 1/1995 |
| JP | 2002-157154 | 5/2002 |
| KR | 10-2007-0030606 A | 3/2007 |
| WO | WO 2004-059523 A2 | 7/2004 |

\* cited by examiner

*Primary Examiner* — Leslie Wong
(74) *Attorney, Agent, or Firm* — Roylance, Abrams, Berdo & Goodman, LLP (57) ABSTRACT

A method and apparatus for automatically classifying files on a mobile communication terminal are provided. The inventive method and apparatus enable the files to be automatically classified and copied into a desired storage folder on the mobile communication terminal. An exemplary method for automatically classifying files on a mobile communication terminal includes receiving a command to copy a selected file, determining an attribute of the selected file, determining a storage folder in which to store the file according to the attribute of the file and copying and storing the file in the determined storage folder. The method and apparatus enable files that a user desires to copy from an external device to the user's mobile communication terminal to be automatically classified according to their attributes and be stored in storage folders corresponding to the attributes, thus minimizing the inconvenience of individually designating a storage folder for each file whenever the files are copied.

17 Claims, 5 Drawing Sheets

| FILENAME EXTENSION FIELD | FILE ATTRIBUTE FIELD |
|---|---|
| wma | AUDIO ATTRIBUTE |
| mp3 | AUDIO ATTRIBUTE |
| asf | MULTI-ATTRIBUTE |
| doc | DOCUMENT ATTRIBUTE |
| mpg | VIDEO ATTRIBUTE |
| jpg | IMAGE ATTRIBUTE |
| ppt | DOCUMENT ATTRIBUTE |
| avi | VIDEO ATTRIBUTE |
| glf | IMAGE ATTRIBUTE |
| ⋮ | ⋮ |

FIG. 4

| FILE ATTRIBUTE FIELD | STORAGE FOLDER FIELD |
|---|---|
| AUDIO ATTRIBUTE | / data / contents / sound |
| VIDEO ATTRIBUTE | / data / contents / video |
| IMAGE ATTRIBUTE | / data / contents / image |
| DOCUMENT ATTRIBUTE | / data / contents / text |
| OTHERS ATTRIBUTE | / data / others |

METHOD AND APPARATUS FOR AUTOMATICALLY CLASSIFYING FILES ON MOBILE COMMUNICATION TERMINAL

CROSS-REFERENCE TO RELATED APPLICATIONS

This application claims the benefit under 35 U.S.C. §119(a) of Korean Patent Application Serial No. 2006-72882, filed in the Korean Intellectual Property Office on Aug. 2, 2006, the entire disclosure of which is hereby incorporated by reference.

BACKGROUND OF THE INVENTION

1. Field of the Invention

The present invention relates to a method and apparatus for automatically classifying files on a mobile communication terminal. More particularly, the present invention relates to an apparatus and method for automatically classifying files on a mobile communication terminal that enables files to be automatically classified and copied into a desired storage folder on the mobile communication terminal.

2. Description of the Related Art

In general, a mobile communication terminal refers to a terminal that is carried by an individual user and that supports various functions using application programs including wireless communication services. Examples of a mobile communication terminal include a personal mobile communication services terminal, a personal digital assistant (PDA), a smart phone, an international mobile telecommunication 2000 (IMT-2000) terminal, and a wireless local area network (LAN) terminal.

Conventional mobile communication terminals generally have voice call and short message service (SMS) functions. Recent rapid developments in mobile communication technology enabled a mobile communication terminal to support diverse and sophisticated functions including video calls, electronic-note functions, audio/image storage, Internet access, entertainment features, music playing functions, and camera functions to satisfy the changing needs of mobile consumers. Thus, a mobile user can use a mobile communication terminal to perform various tasks, including placing a voice call, taking a picture, and accessing the Internet.

The frequent use of a mobile communication terminal for these various tasks has increased the need for moving or copying data files used to perform each function (hereinafter representatively called "copying") into a mobile communication terminal. A user of a conventional mobile communication terminal has typically copied such files, selected from a personal computer (PC) or other external source, into a single folder on the mobile communication terminal. However, this makes it difficult to systematically manage all data files stored in the single folder.

One approach to solving the drawbacks noted above is to classify data files by type and copy each file into an appropriate folder. However, the conventional approach has a drawback that a mobile terminal user needs to inconveniently designate a folder in which to store a file each time they copy a file.

Accordingly, there is a need for an improved method and apparatus for automatically classifying files on a mobile communication terminal to provide enhanced convenience for a user.

SUMMARY OF THE INVENTION

Exemplary embodiments of the present invention address at least the above problems and/or disadvantages and provide at least the advantages described below. Accordingly, an object of the present invention is to provide a method and apparatus for automatically classifying files on a mobile communication terminal that enables files to be automatically classified and be copied into appropriate folders.

According to an exemplary embodiment of the present invention, there is provided a method for automatically classifying files in order to copy a selected file into a mobile communication terminal having a plurality of storage folders, the method comprising receiving a command to copy the selected file, determining an attribute of the selected file, determining a storage folder in which to store the file according to the attribute of the file and copying and storing the file in the determined storage folder.

According to another exemplary embodiment of the present invention, there is provided a mobile communication terminal having a file copying function, the terminal including a first attribute determiner for determining an attribute of a selected file using a filename extension for the file, a second attribute determiner for determining an attribute of the selected file by analyzing a header for the file, a storage folder determiner for determining a storage folder in which to store the file using the attributes of the file determined by the first and second attribute determiners and a file storage unit having the determined storage folder.

According to another exemplary embodiment of the present invention, there is provided a computer readable medium having stored thereon instructions for executing a method for automatically classifying files to be copied into a mobile communication terminal, the instructions comprising a first set of instructions for, after receiving a command to copy a file, determining an attribute of the file and a second set of instructions for determining a storage folder in which to store the file according to the attribute of the file.

According to another exemplary embodiment of the present invention, there is provided a method for copying files into a mobile communication terminal, the method comprising determining an attribute of a file to be copied into a mobile terminal, determining a memory location for the file corresponding to the determined attribute and copying and storing the file in the determined memory location In an exemplary embodiment, if the attribute of the file determined by the first attribute determiner is a multi-attribute, the storage folder determiner may determine the storage folder using the attribute of the file determined by the second attribute determiner.

BRIEF DESCRIPTION OF THE DRAWINGS

The above and other objects, features and advantages of the present invention will be more apparent from the following detailed description in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Hereinafter, exemplary embodiments of the present invention are described in detail with reference to the accompanying drawings. The dimensions of some elements in the drawings may be exaggerated for better visualization and have not necessarily been drawn to scale.

In a mobile communication terminal according to an exemplary embodiment of the present invention, a controller may include a first attribute determiner, a second attribute determiner, and a storage folder determiner. A storage unit may include a file storage having a storage folder.

Figure 1:
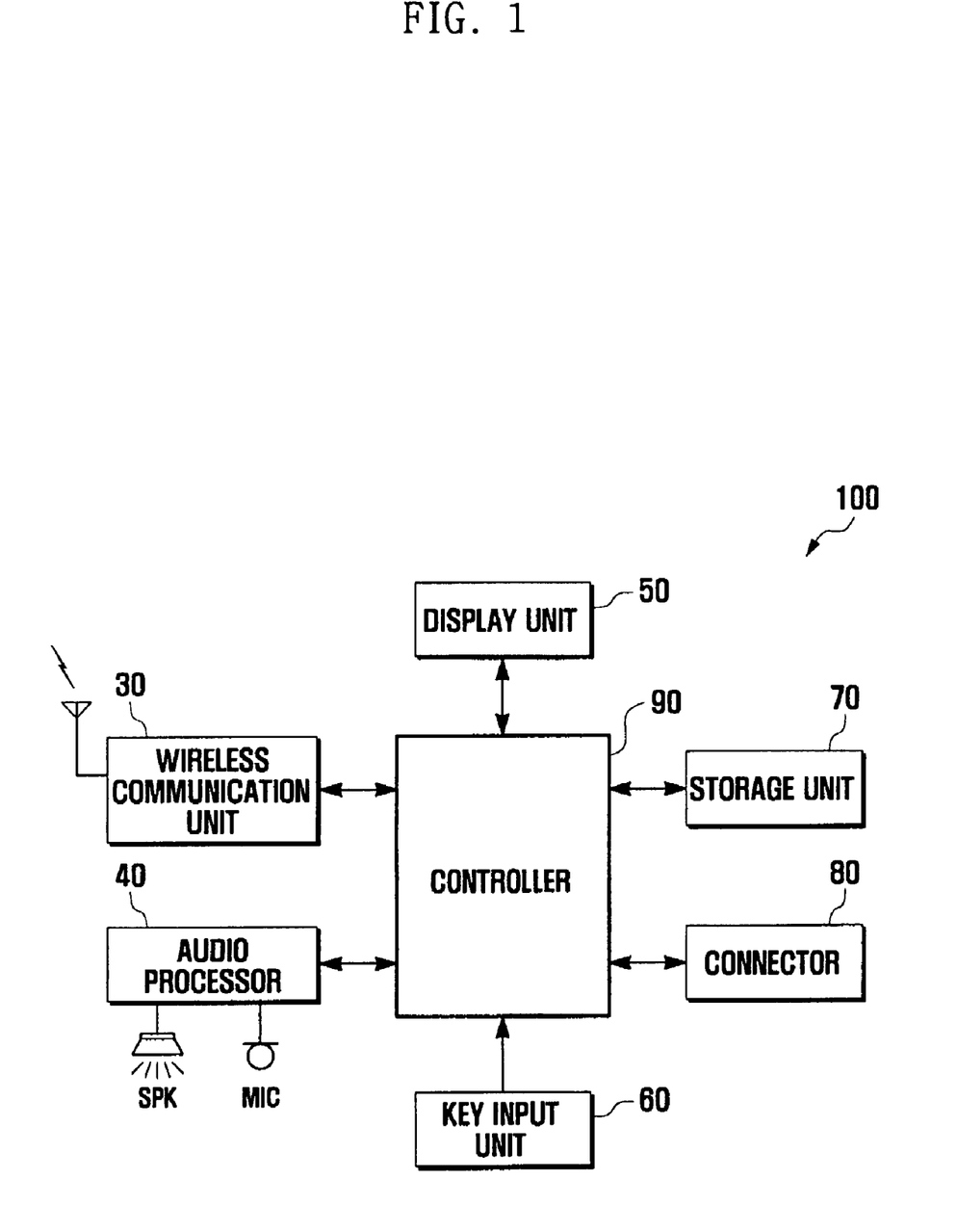
FIG. 1 is a schematic block diagram illustrating the configuration of a mobile communication terminal according to an exemplary embodiment of the present invention.

FIG. 1 is a schematic block diagram illustrating the configuration of a mobile communication terminal 100 according to an exemplary embodiment of the present invention.

Referring to FIG. 1, the mobile communication terminal 100 includes a wireless communication unit 30, an audio processor 40, a display unit 50, a key input unit 60, a storage unit 70, a connector 80, and a controller 90.

The wireless communication unit 30 transmits and receives data for wireless communication through the mobile communication terminal 100. To achieve this function, the wireless communication unit 30 includes an RF transmitter that up-converts and amplifies a signal for transmitting through an antenna and an RF receiver that low-noise amplifies a signal received through the antenna and down-converts the signal. The wireless communication unit 30 receives data via a radio channel and outputs the data to the controller 90. The wireless communication unit 30 also receives data from the controller 90 and transmits the data through the radio channel.

The audio processor 40 includes a coder/decoder (codec). The codec consists of a data codec for processing data such as packet data and an audio codec for processing audio signals such as voice. The audio processor 40 converts a digital audio signal fed from the controller 90 to an analog signal through the audio codec during a voice call on the mobile terminal 100 and plays back the analog signal through a speaker SPK. The audio processor 40 also converts an analog audio signal received through a microphone MIC to a digital audio signal through the audio codec and transmits the digital audio signal to the controller 90.

The display unit 50 displays screen data delivered from the controller 90, such as call screen data, pop-up window and the like. The display unit 50 may be a liquid crystal display (LCD). In an exemplary embodiment, the display unit 50 includes an LCD controller, a memory for storing image data, an LCD display element and the like. When the LCD is implemented using a touch screen technology, the screen of the display unit 50 may function as an input portion.

The key input unit 60 receives a user's manipulation signal for controlling the mobile communication terminal 100 to transmit a signal to the controller 90. To achieve this function, the key input unit 60 includes multiple character keys (not shown) for inputting numeric and character information and control keys (not shown) for controlling the operation of the mobile communication terminal 100.

The storage unit 70 may comprise a synchronous dynamic random access memory (SDRAM), NAND memory, and the like. The storage unit 70 includes a program memory for storing programs for controlling the operation of the mobile communication terminal 100 and a data memory for storing data generated while executing the programs. According to an exemplary embodiment, the storage unit 70 has a plurality of storage folders for storing files being copied from external devices. The plurality of storage folders include an audio folder, a video folder, a document folder, an image folder, and an others folder.

The connector 80 includes a Universal Serial Bus (USB) controller and may be connected to a PC (not shown) through a cable.

The controller 90 controls the operation of the mobile communication terminal 100 according to a user's manipulation signal received through the key input unit 60 or an operation algorithm. When an external file is copied into the storage 70, the controller 90 determines an attribute of the file and copies the file into a storage folder corresponding to the determined attribute.

Figure 2:
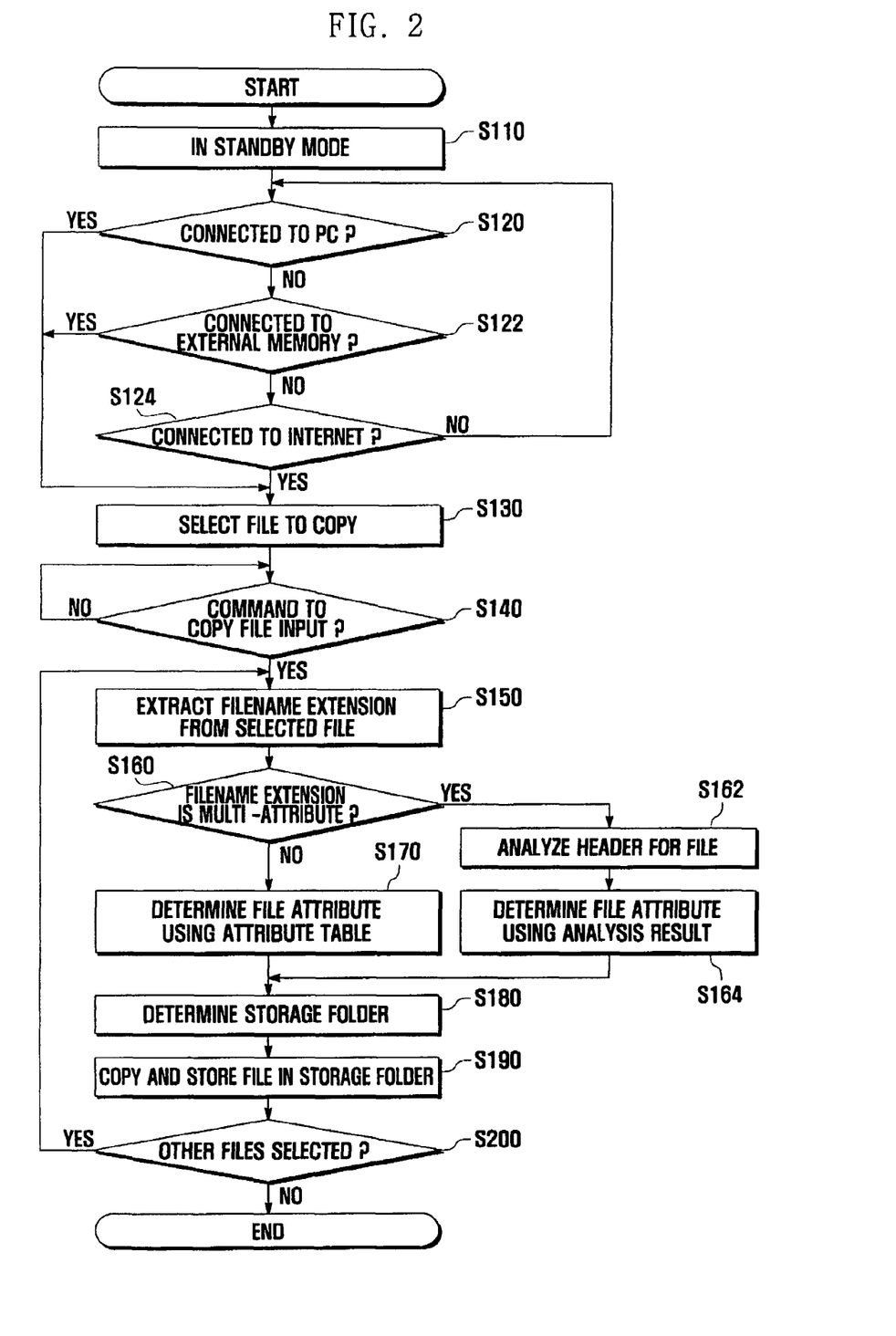
FIG. 2 is a flowchart illustrating a method for automatically classifying files on a mobile communication terminal according to an exemplary embodiment of the present invention.

FIG. 2 is a flowchart illustrating a method for automatically classifying files on a mobile communication terminal according to an exemplary embodiment of the present invention.

Referring to FIGS. 1 and 2, an exemplary method begins when it is determined whether the mobile communication terminal 100 in a standby mode (S 110) is connected to an external device (S120 through S124). The external device refers to a device that is connected to the mobile communication terminal 100 and that allows transmission/reception of files with the mobile communication terminal 100. In an exemplary embodiment, the external device includes a PC (not shown), an external memory (not shown), and the like. Further, connection to an external device includes connection of the mobile communication terminal 100 to the Internet using wireless communication because connection to the Internet allows transmission/reception of data with the mobile communication terminal 100.

The controller 90 determines whether the mobile communication terminal 100 is connected to a PC (S120). The mobile communication terminal 100 may be connected to a PC on a wired basis through the connector 80 or using a local wireless communication interface such as Bluetooth. In either example, the controller 90 recognizes the connection to the PC.

If the mobile communication terminal 100 is not connected to a PC, the controller 90 determines whether an external memory device is connected to the mobile terminal (S122). An exemplary connection to an external memory device includes the external memory device being inserted into an external memory slot (not shown) of the mobile communication terminal 100. If the mobile communication terminal 100 is not connected to an external memory device, the controller 90 determines whether the mobile communication terminal 100 is connected to the Internet (S124).

If the mobile communication terminal 100 is connected to at least one of a PC, an external memory and the Internet, the controller 90 selects a file to be copied from an appropriate external device connected to the mobile communication terminal 100 according to a user's request (S130). The controller selects the requested file from among files that have been stored in an external memory or PC or can be downloaded through the Internet. At this step, the controller 90 may simultaneously select a plurality of requested files.

After the files to be copied have been selected, the controller 90 determines whether a command to copy a file is input (S140). When the user inputs a command to copy a file, the controller 90 recognizes the input of the command and extracts information about the selected files.

The controller 90 selects one of the selected files to extract a filename extension from the file. For example, if the name of the selected file is 'piano.mp3', the controller 90 extracts a filename extension '.mp3' (S150).

The controller 90 determines whether the extracted filename extension is a multi-attribute extension such as '.asf' (S160). In an exemplary embodiment, files are classified into files having one of an image attribute, an audio attribute, a video attribute, a document attribute, a multi-attribute, and an others attribute. In general, when a user copies a file into the mobile communication terminal 100, the file is most often a content data file.

Whereas, in the above description, files are classified according to the attribute of content, they may be classified according to other parameters. In the present embodiment, a multi-attribute file refers to a file having two or more attributes. For example, when the name of a file is 'flute.asf', filename extension '.asf' may contain audio and video attributes. That is, a 'flute.asf' file having only an audio attribute is used to output an audio component without a video component. A 'flute.asf' file having both audio and video attributes is used to output video and audio components.

If the extracted filename extension is not a multi-attribute extension in step 160, the controller 90 determines the attribute of the file using the extracted filename extension (S170). The controller 90 refers to an attribute table to determine the attribute of the file.

Figure 3:
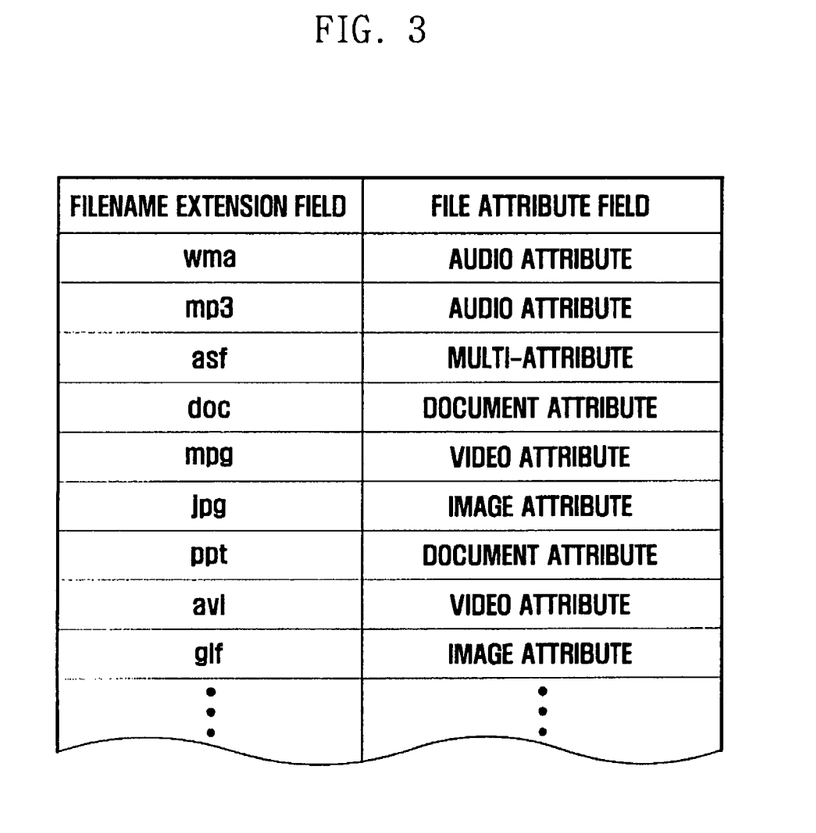
FIG. 3 is a schematic diagram illustrating an attribute table according to an exemplary embodiment of the present invention.

FIG. 3 is a schematic diagram illustrating an attribute table according to an exemplary embodiment of the present invention.

Referring to FIGS. 1-3, an exemplary attribute table as illustrated therein may consist of a filename extension field and a file attribute field.

The filename extension field specifies various filename extensions. Thus, the controller 90 searches filename extensions in the filename extension field of the attribute table for a filename extension extracted from a selected file.

The file attribute field specifies a file attribute for a corresponding filename extension. After finding the filename extension in the filename extension field, the controller 90 uses a file attribute defined in a file attribute field corresponding to the filename extension to determine the attribute of the selected file.

For example, if the filename extension for the selected file is '.mp3', the file attribute is an audio attribute. If the filename extension for the selected file is '.avi', the file attribute is a video attribute. If the filename extension is '.jpg' or '.gif', the file attribute is an image attribute.

The attribute table may be stored in the storage unit 70 or internally stored in the controller 90. Further, the attribute table may be added to or modified by a user. Thus, it is possible for a user to directly designate a file attribute for a desired filename extension.

In an exemplary embodiment, if the extracted filename extension is not stored in the filename extension field of the attribute table, the controller 90 determines the attribute of the selected file as an others attribute. That is, the attributes of files having filename extensions not contained in the filename extension field are all determined as the others attribute. The files determined to have the others attribute are copied into the same folder, which is described later with reference to FIG. 4.

If an extracted filename extension is a multi-attribute extension, it is difficult to precisely determine the attribute of the file (for example, 'flute.asf') using the filename extension (for example, '.asf').

Returning to FIG. 2, if the extracted filename extension is a multi-attribute extension in step S160, the controller 90 analyzes a header for the selected file (S162). The controller 90 extracts a key file attribute information, such as Multipurpose Internet Mail Extension (MIME) content-type, from the header for the file.

After extracting the file attribute information from the header, the controller 90 determines the attribute of the selected file based on the file attribute information (S164). For example, if the file attribute information stored in the file header contains only an audio attribute, the controller 90 determines the attribute of the selected file as an audio attribute. If the file attribute information contains both audio and video attributes, the controller 90 determines the attribute of the selected file as a video attribute.

Figure 4:
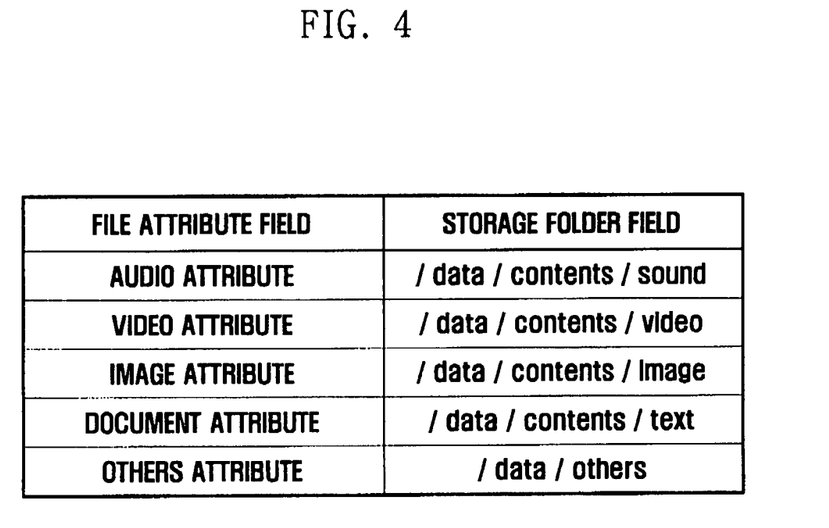
FIG. 4 is a schematic diagram illustrating a storage folder table according to an exemplary embodiment of the present invention.

After determining the attribute of the file in this manner, the controller 90 determines a storage folder into which the file will be copied according to the attribute of the file (S180). The controller 90 refers to a storage folder table to determine a storage folder for the file according to the attribute of the file. FIG. 4 is a schematic diagram illustrating a storage folder table according to an exemplary embodiment of the present invention. Referring to FIG. 4, the storage folder table consists of a file attribute field and a storage folder field.

The file attribute field contains all file attributes defined in the file attribute field within an attribute table. Each item of the storage folder field contains a path to a folder for storing each file based on a file attribute. In an exemplary embodiment, storage folders include an image folder, a sound folder, a video folder, a text folder, and an others folder. Additional folders may be included and current folders may be deleted or renamed as a user desires.

For example, a storage folder for a file having an audio attribute is a sound folder located at a path '/data/contents/sound'. A storage folder for a file having an image attribute is an image folder located at a path '/data/contents/image'. A storage folder for a file having an others attribute is an 'others' folder located at '/data/others'.

Referring to FIG. 2, after determining the storage folder for the file, the controller 90 copies the file into the storage folder for storage (S 190). After storing the file in the storage folder, the controller 90 determines whether other files are selected by the user (S200). If other files are not selected by the user, the controller 90 terminates the process of copying a file, and if other files are selected by the user, the controller 90 selects one of the user-selected files and repeats the steps S150 through S190 for the selected file.

The method for automatically classifying files according to an exemplary embodiment enables a file selected by a user to be automatically copied into a folder according to the attribute of the file when the user inputs a command to copy the file, thus reducing the inconvenience of separately classifying or managing files stored in the mobile communication terminal 100.

Figure 5A:
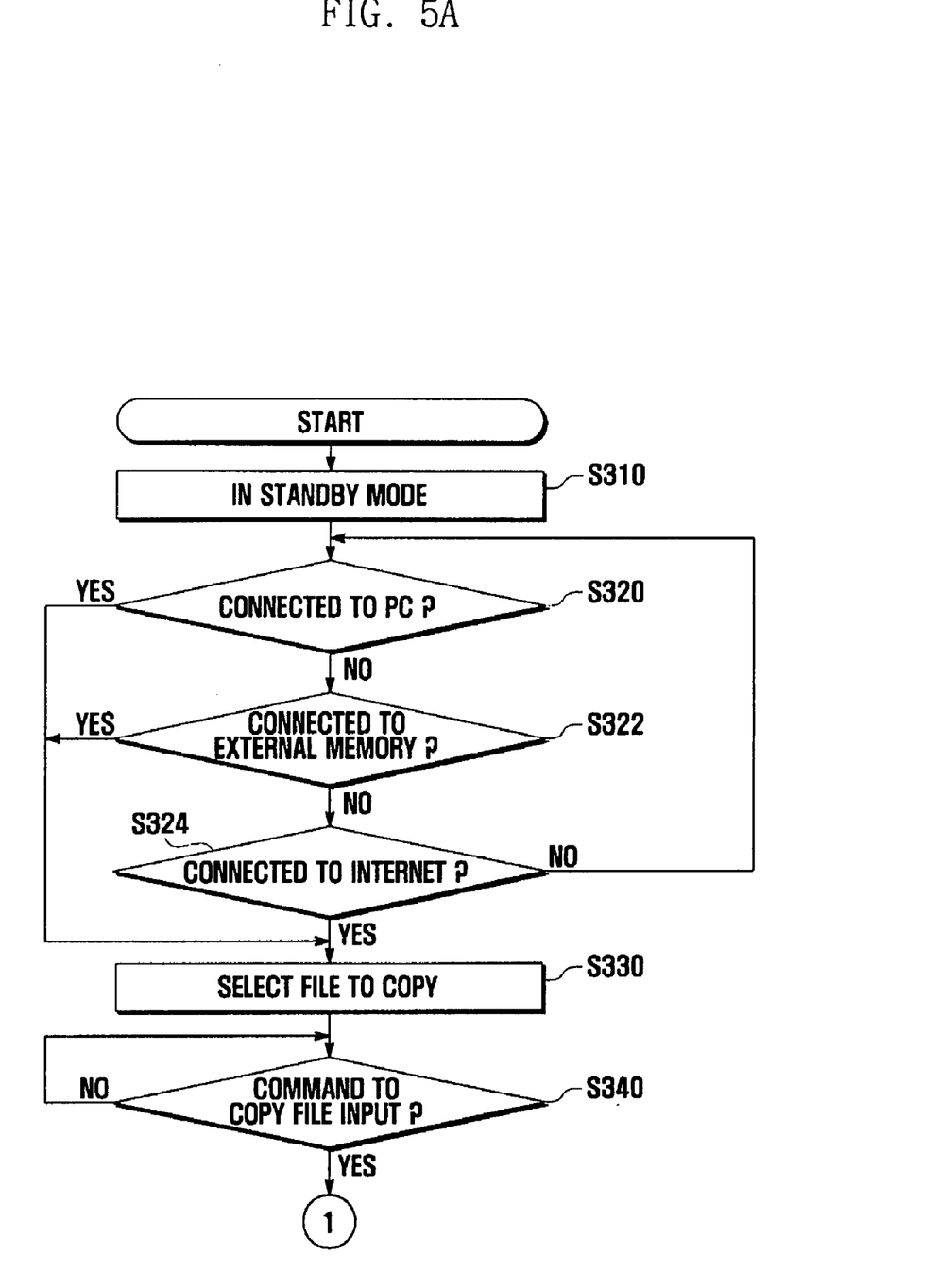
FIG. 5A to 5B are flowcharts illustrating a method for automatically classifying files on a mobile communication terminal according to an exemplary embodiment of the present invention.
Figure 5B:
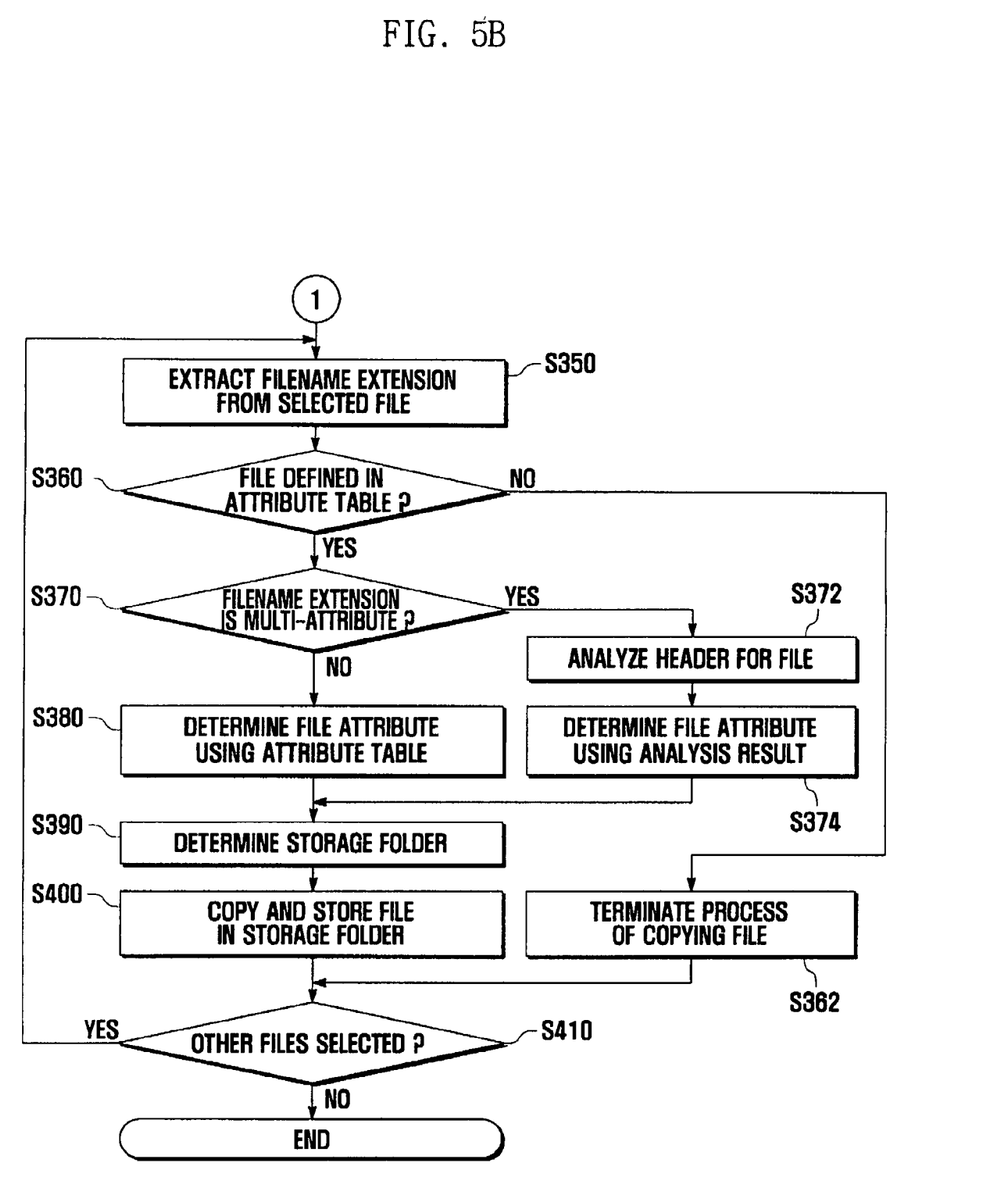

FIG. 5A to 5B are flowcharts illustrating a method for automatically classifying files on a mobile communication terminal according to an exemplary embodiment of an exemplary invention.

The method illustrated in FIG. 5A to 5B according to an exemplary embodiment is performed in an analogous manner as the method illustrated in FIG. 2, except for the step of processing a file having a filename extension not defined in an attribute table. Thus, a detailed explanation of the same steps as illustrated in FIG. 2 is not given here. The step of processing a file having a filename extension not defined in the attribute table is described here in detail with reference to FIGS. 1, 3, and 5.

Referring to FIGS. 1, 3, and 5, steps S310 through S350 in FIG. 5A to 5B are analogous to steps S110 through S150 of FIG. 2, and thus a detailed explanation thereof is not given here.

After extracting a filename extension for a selected file in step S350, the controller 90 determines whether the extracted filename extension is contained in the filename extension field within the attribute table (S360). For example, if the name of the selected file is 'drum.bak', the controller 90 searches the filename extension field for the filename extension '.bak'.

If the extracted filename extension is not contained in the attribute table, the controller 90 determines the attribute of the file as an others attribute and terminates the process of copying the file (S362). Thus, files having filename extensions not defined in the attribute table are not copied into the mobile communication terminal 100 even if they are selected in the step S330.

If the extracted filename extension is contained in the attribute table, steps S370 through S400 are performed. Since the steps S370 through S400 are similar to the steps S160 through S190 in FIG. 2, only a brief description thereof is given here.

When the extracted filename extension is defined in the attribute table, the controller 90 determines whether the extracted filename extension is a multi-attribute extension (S370).

If the extracted filename extension is not a multi-attribute extension, the controller 90 refers to the attribute table and determines the attribute of the file for the extracted extension (S380).

If the extracted filename extension is a multi-attribute extension, the controller 90 analyzes a header for the selected file (S372). The controller 90 extracts file attribute information from the header for the file and determines the attribute of the selected file based on the file attribute information (S374).

After determining the attribute of the file, the controller 90 refers to a storage folder table to determine a storage folder into which the file will be copied according to the attribute of the file (S390).

After determining the storage folder for the file, the controller 90 copies the file into the storage folder for storage (S400).

After storing the file in the storage folder, the controller 90 determines whether other files are selected by the user (S410). If other files are not selected by the user, the controller 90 terminates the process of copying a file, and if other files are selected by the user, the controller 90 selects one of the user-selected files and repeats the steps S350 through S400 for the selected file.

While a method for automatically classifying files on a mobile communication terminal according to exemplary embodiments of the present invention have been particularly shown and described with reference to embodiments thereof, it will be understood by those of ordinary skill in the art that various changes in form and details may be made therein without departing from the spirit and scope of the present invention as defined by the following claims.

For example, whereas, in the above description, a file is stored using an attribute table and a storage folder table, the attribute table and the storage folder table may be integrated into a single table or database. Further, whereas, in the above description, the header for a file is analyzed when the selected file has multiple attributes, various other methods can be used to effectively determine the attribute of a file. For example, headers for all selected files may be analyzed to determine the attributes of the files.

Certain exemplary embodiments of the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, functional programs, codes, and code segments for accomplishing the present invention can be easily construed as within the scope of the invention by programmers skilled in the art to which the present invention pertains.

As described above, a method for automatically classifying files on a mobile communication terminal according to exemplary embodiments of the present invention involves automatically classifying files that a user desires to move or copy into their mobile communication terminal according to their attributes and storing the files in storage folders corresponding to the attributes. Thus, the method can minimize the inconvenience of individually designating a storage folder for each file whenever files are moved or copied.

While certain features and advantages of exemplary embodiments of the present invention have been described above, one of ordinary skill in the art would readily appreciate that other implementations and advantages may be achieved without departing from the teachings and spirit of the invention, the scope of which is defined by the following claims and their equivalents.

What is claimed is:

1. A method for automatically classifying files to be copied into a mobile communication terminal, the method comprising:

in response to receiving a command to copy a file into the mobile communication terminal, determining by the mobile communication terminal, an attribute of the file, wherein the determining of the attribute of the file comprises:
extracting a filename extension for the file;
determining that the attribute of the file cannot be determined based on the filename extension if the filename extension comprises a multi-attribute extension;
analyzing a header for the file, if the attribute cannot be determined based on the filename extension; and
determining the attribute of the file using the extracted filename extension or a result of the analyzing step;
determining, by the mobile communication terminal, a storage folder from among a plurality of storage folders in the mobile communication terminal in which to store the file according to the attribute of the file, wherein the storage folder is determined without user input; and
copying and storing the file in the determined storage folder.

2. The method of claim 1, further comprising:
determining whether the mobile communication terminal is connected to at least one of a personal computer (PC), an external memory, and the Internet; and selecting the file located in the at least one of the PC, the external memory, or the Internet connected to the mobile communication terminal, if the mobile communication terminal is connected to the at least one of a PC, an external memory, and the Internet.

3. The method of claim 1, wherein the step of determining that the attribute cannot be identified based on the filename extension is performed after the extracting of the filename extension for the file.

4. The method of claim 1, wherein the analyzing of the header for the file comprises using a Multipurpose Internet Mail Extension (MIME) content-type stored in the header.

5. The method of claim 1, wherein the determining of the attribute of the file comprises using an attribute table comprising at least one of a filename extension field including a plurality of different filename extensions and a file attribute field specifying file attributes for the filename extensions.

6. The method of claim 1, wherein the determining of the storage folder in which to store the file comprises determining the storage folder according to the attribute of the file using a storage folder table.

7. The method of claim 6, wherein the storage folder table comprises at least one of a file attribute field including a plurality of different file attributes and a storage folder field specifying storage folders corresponding to the file attributes in the file attribute field.

8. The method of claim 1, wherein the file attribute comprises at least one of an image attribute, an audio attribute, a video attribute, a document attribute, a multi-attribute, and an other attribute.

9. The method of claim 8, wherein the determining of the attribute of the file comprises determining that the attribute of the file is the other attribute if the file does not have any one of the image attribute, the audio attribute, the video attribute, the document attribute, and the multi-attribute.

10. The method of claim 8, wherein the copying of the file is not performed if the attribute of the file is determined to be the other attribute.

11. The method of claim 8, wherein the storage folder includes at least one of an image folder, a sound folder, a video folder, a document folder, and an other folder.

12. The method of claim 11, wherein, if the attribute of the file is determined to be the other attribute, the determining of the storage folder comprises determining the storage folder is the other folder.

13. The method of claim 1, wherein, when a command to copy a plurality of files is received in the command, the determining of the attribute of the file, the determining of the storage folder, and the copying and storing of the file in the determined storage folder are repeated for each of the plurality of files to sequentially copy the plurality of files.

14. The method of claim 8, wherein the multi-attribute comprises at least one of an audio and a video attribute.

15. A mobile communication terminal having a file copying function, comprising:
a first attribute determiner for determining an attribute of a file to be copied into the mobile communication terminal, wherein the first attribute determiner determines the attribute of the file using a filename extension for the file;
a second attribute determiner for determining the attribute of the file if the filename extension for the file comprises a multi-attribute such that the attribute of the file cannot be determined based on the filename extension for the file, wherein the second attribute determiner determines the attribute of the file by analyzing a header for the file;
a storage folder determiner for determining, without user input, a storage folder from a plurality of storage folders in which to store the file using the attribute of the file determined by one of the first and second attribute determiners; and
a file storage unit comprising the determined storage folder for storing the file.

16. A non-transitory computer usable storage medium having stored thereon instructions for executing a method for automatically classifying files to be copied into a mobile communication terminal, the storage medium comprising:
a first set of instructions for, in response to receiving a command to copy a file into the mobile communication terminal, extracting a filename extension for the file and determining whether the filename extension of the file corresponds to a multi-attribute, such that an attribute used to store the file cannot be determined;
a second set of instructions for determining the attribute of the file by analyzing a header for the file if the filename extension of the file corresponds to a multi-attribute; and
a third set of instructions for determining a storage folder, without user input, from among a plurality of storage folders in the mobile communication terminal in which to store the file according to the attribute determined from the filename extension or from analyzing the header of the file; and
a fourth set of instructions for copying and storing the file in the determined storage folder.

17. A method for copying files into a mobile communication terminal, the method comprising:
in response to receiving a command to copy a file into the mobile communication terminal, determining, by the mobile communication terminal, an attribute of a file to be copied into the mobile communication terminal, wherein the attribute of the file is determined using a filename extension extracted from the file or by analyzing a header for the file if the filename extension is directed to a multi-attribute, such that the attribute of the file cannot be determined based on the filename extension;
determining, by the mobile communication terminal, a memory location for the file corresponding to the determined attribute from among a plurality of memory locations in the mobile communication terminal, wherein the memory location for the file is determined without user input; and
copying and storing the file in the determined memory location.

* * * * *